(12) United States Patent
Jung et al.

(10) Patent No.: US 11,317,347 B2
(45) Date of Patent: Apr. 26, 2022

(54) METHOD AND APPARATUS FOR PROVIDING SERVICE BY USING BLUETOOTH LOW ENERGY TECHNOLOGY

(71) Applicant: LG ELECTRONICS INC., Seoul (KR)

(72) Inventors: Sungwon Jung, Seoul (KR); Donghyun Kang, Seoul (KR); Taeyoung Song, Seoul (KR)

(73) Assignee: LG Electronics Inc., Seoul (KR)

(*) Notice: Subject to any disclaimer, the term of this patent is extended or adjusted under 35 U.S.C. 154(b) by 167 days.

(21) Appl. No.: 16/624,739

(22) PCT Filed: Jun. 19, 2018

(86) PCT No.: PCT/KR2018/006906
§ 371 (c)(1),
(2) Date: Dec. 19, 2019

(87) PCT Pub. No.: WO2018/236124
PCT Pub. Date: Dec. 27, 2018

(65) Prior Publication Data
US 2020/0221383 A1    Jul. 9, 2020

Related U.S. Application Data

(60) Provisional application No. 62/521,541, filed on Jun. 19, 2017.

(51) Int. Cl.
*H04L 12/26* (2006.01)
*H04W 52/02* (2009.01)
(Continued)

(52) U.S. Cl.
CPC ........ *H04W 52/0229* (2013.01); *H04W 4/80* (2018.02); *H04W 76/14* (2018.02)

(58) Field of Classification Search
None
See application file for complete search history.

(56) References Cited

U.S. PATENT DOCUMENTS 7,774,015 B2    8/2010    Madine et al.
2012/0022948 A1    1/2012    Jones et al.
(Continued)

FOREIGN PATENT DOCUMENTS

KR    20130096619 A    8/2013
KR    101738760 B1    5/2017

*Primary Examiner* — Zewdu A Beyen
(74) *Attorney, Agent, or Firm* — Dentons US LLP (57) ABSTRACT

The disclosure relates to a method and an apparatus for providing a service by a first device with a main device in a wireless communication system. The disclosure provides a method and an apparatus in which: in a specific state, a first device transmits an advertising packet indicating a state of the first device to the main device, connects with the main device via Bluetooth LE, on the basis of the advertising packet, and then activates the main power in order to provide a specific service together with the main device, wherein the specific mode state indicates a state in which a low power wireless communication module for transmitting or receiving a packet of the Bluetooth LE has been activated and the main power has been deactivated, and the main power is activated when the first device recognizes activation of the main power of the main device.

5 Claims, 9 Drawing Sheets

(51) Int. Cl.
*H04W 76/14* (2018.01)
*H04W 4/80* (2018.01)

(56) References Cited

U.S. PATENT DOCUMENTS

2014/0179234 A1 6/2014 Lee et al.
2018/0376424 A1* 12/2018 Bertrand ............... H04W 4/029

* cited by examiner

METHOD AND APPARATUS FOR PROVIDING SERVICE BY USING BLUETOOTH LOW ENERGY TECHNOLOGY

CROSS-REFERENCE TO RELATED APPLICATIONS

This application is the National Stage filing under 35 U.S.C. 371 of International Application No. PCT/KR2018/006906, filed on Jun. 19, 2018, which claims the benefit of U.S. Provisional Application No. 62/521,541, filed on Jun. 19, 2017, the contents of which are all hereby incorporated by reference herein in their entirety.

TECHNICAL FIELD

The disclosure relates to a method and apparatus for providing a service using Bluetooth, which is a short-range communication technology, and particularly, to a method and apparatus for providing a service by controlling the power and parameters of a device using Bluetooth low energy (BLE) technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DETAILED DESCRIPTION OF THE INVENTION

Technical Problems

Smart devices come with multiple wireless communication interfaces, e.g., Wi-Fi, Bluetooth, or NFC, for wireless communication with other external devices and are in wide use for users' various purposes.

However, as smart devices are diversified and increase, it is hard to predict when a procedure for connection with the other party's device occurs. In other words, since such a context frequently occurs where a plurality of devices are present around a smart device, the smart device is unaware when its surrounding devices form a connection with the smart device.

Of course, although a technical solution for minimizing standby power in the idle time is applied to most of communication devices and communication interfaces and its energy efficiency is superior, advances in technology may limit maintaining all wireless communication interfaces to be developed in the future always in active mode, and this issue may worsen for battery-powered smart devices.

Thus, according to the disclosure, there is proposed a method of setting the power on/off and/or parameters of surrounding devices by relying on the operation of the main device without a separate control operation.

Also proposed is a method of enabling such operation and transmitting advertisement packets not only in an advertisement state for the purpose of transmission of advertisement packets but also in a specific state.

Objects of the disclosure are not limited to the foregoing, and other unmentioned objects would be apparent to one of ordinary skill in the art from the following description.

Technical Solutions

According to the disclosure, there is provided a method of transmitting/receiving data for providing a specific service by a first managing device in a mesh network of a wireless communication system to address the foregoing issues.

Specifically, according to an embodiment of the disclosure, a method for providing a service by a first device along with a main device in a wireless communication system comprises transmitting an advertisement packet indicating a state of the first device to the main device in a specific state, forming a Bluetooth low energy (BLE) connection with the main device based on the advertisement packet, and activating a main power to, together with the main device, provide a specific service, wherein the specific state indicates a state in which a low-power wireless communication module for transmitting/receiving BLE packets is active, and the main power is inactive, and wherein the main power is activated when the first device recognizes activation of a main power of the main device.

Further, according to the disclosure, the method further comprises receiving settings of parameters for providing the specific service from the main device, setting the parameters based on the settings, and providing the specific service using the set parameters.

Further, according to the disclosure, the settings indicate values of the parameters at a last time when the specific service was provided.

Further, according to the disclosure, the method further comprises, when the settings of the parameters are varied, transmitting the varied settings to the main device.

Further, according to the disclosure, the method further comprises deactivating the main power of the first device upon recognizing deactivation of the main power of the main device.

Further, according to the disclosure, the advertisement packet is transmitted to a neighboring device according to a predetermined time interval in the specific mode. A first time interval in which the advertisement packet is periodically transmitted in the specific state is longer than a second time interval in which an advertisement packet transmitted for connection in an advertisement state is transmitted.

Further, according to the disclosure, a first device for providing a service along with a main device in a wireless communication system comprises a communication unit for wirelessly or wiredly communicating with an outside and a processor functionally connected with the communication unit, wherein the processor transmits an advertisement packet indicating a state of the first device to the main device in a specific state, forms a Bluetooth low energy (BLE) connection with the main device based on the advertisement packet, and activates a main power to, together with the main device, provide a specific service, wherein the specific state indicates a mode state in which a low-power wireless communication module for transmitting/receiving BLE packets is active, and the main power is inactive, and wherein the main power is activated when the first device recognizes activation of a main power of the main device.

ADVANTAGEOUS EFFECTS

According to the disclosure, a method for providing a service from a first device to a main device in a wireless communication system may control the power of devices connected depending on the power on/off of the main device.

Further, according to the disclosure, it is possible to power on/off the surrounding connected devices without separate power control by powering on/off the main device.

Further, according to the disclosure, it is possible to enable power on/off control depending on the uses of devices by controlling the power on/off of the surrounding connected devices depending on the power on/off of the main device.

Further, according to the disclosure, it is possible to efficiently provide a specific service by storing the last parameter settings for providing the specific service and using the stored parameter settings for providing the specific service in the future.

Effects of the disclosure are not limited to the foregoing, and other unmentioned effects would be apparent to one of ordinary skill in the art from the following description.

MODE FOR CARRYING OUT THE INVENTION

The aforementioned objects, features and advantages of the disclosure will become more apparent through the following detailed description with respect to the accompanying drawings. Hereinafter, the embodiments of the disclosure will be described with reference to the accompanying drawings, in which like numbers refer to like elements throughout the specification. In describing the disclosure, a detailed description of known techniques associated with the disclosure unnecessarily obscure the gist of the disclosure, it is determined that the detailed description thereof will be omitted.

Hereinafter, a terminal related to the disclosure will be described in detail with reference to the accompanying drawings. In the following description, usage of suffixes such as 'module', 'part' or 'unit' used for referring to elements is given merely to facilitate explanation of the disclosure, without having any significant meaning by itself.

As used herein, "message" may also be termed a data packet, frame, or PDU.

Figure 1:
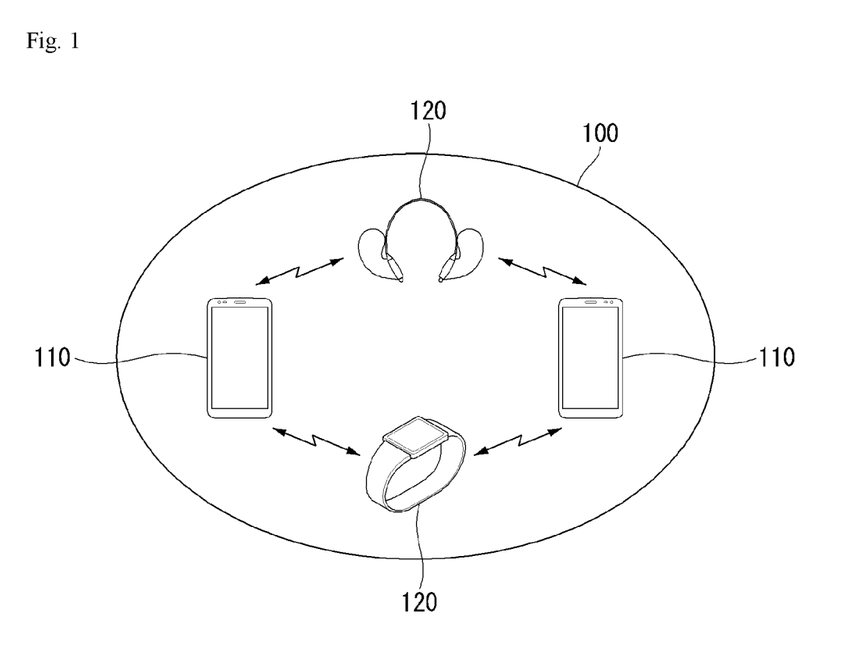
FIG. 1 is a view schematically illustrating an example wireless communication system using Bluetooth low power energy technology to which the disclosure applies.

FIG. 1 is a view schematically illustrating an example wireless communication system using Bluetooth low power energy technology to which the disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be referred to as a data service device, slave device, slave, server, conductor, host device, gateway, sensing device, monitoring device, second device, or audio gate (AG), and the client device 110 may also be referred to as a master device, master, client, member, sensor device, sink device, collector, first device, or hands-free device.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Figure 2:
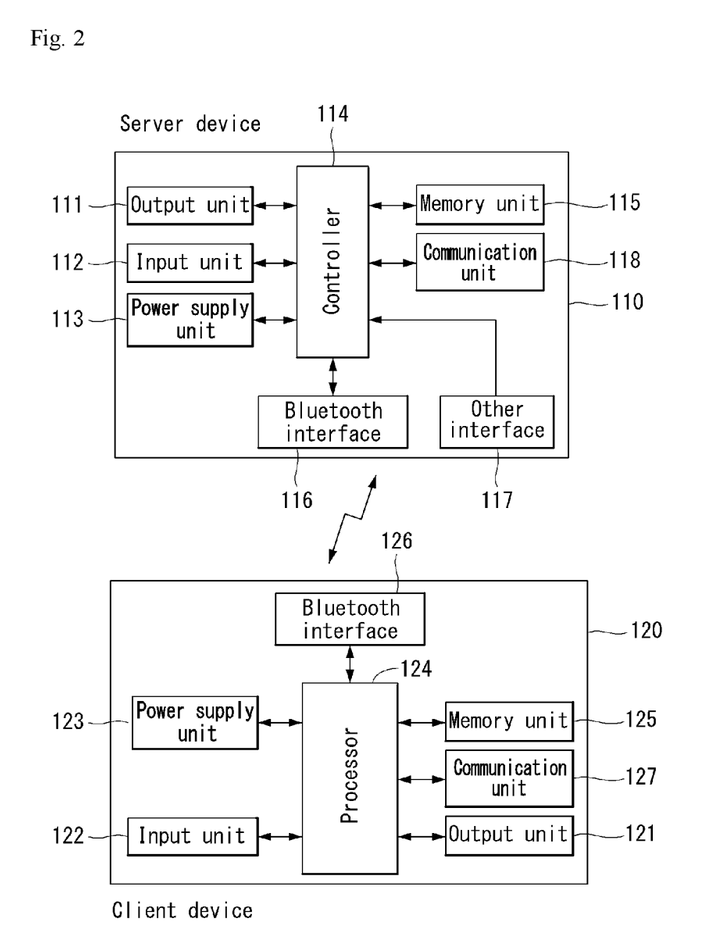
FIG. 2 is a block diagram illustrating an example internal configuration of a device to which the disclosure applies.

FIG. 2 illustrates one example of an internal block diagram of a device in which methods according to the disclosure can be implemented.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device.

The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As described above, BLE technology uses a small duty cycle and capable of reducing power consumption considerably through low data transmission rate, by which the power supply unit can provide power required to operate individual elements even with small output power (less than 10 mw (10 dBm)).

The user input interfaces 112 and 122 refer to modules providing a user input such as a screen button to the controllers to enable the user to control an operation of the devices.

Figure 3:
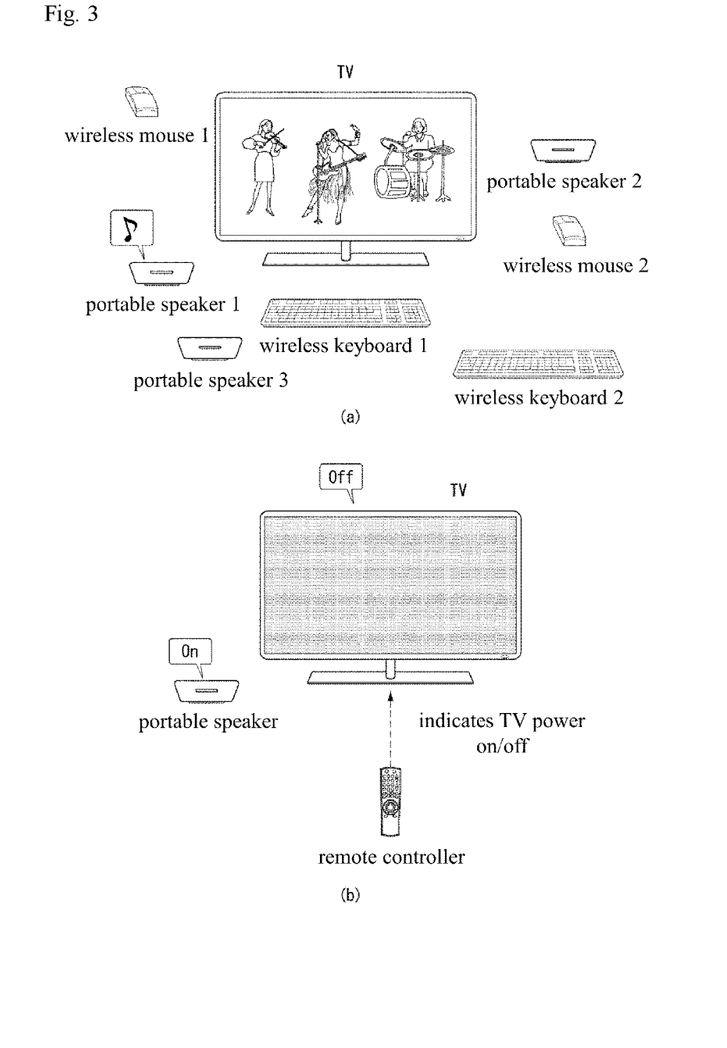
FIG. 3 is a view schematically illustrating an example environment of using devices to which the disclosure is applicable.

FIG. 3 is a view schematically illustrating an example environment of using devices to which the disclosure is applicable.

As shown in FIG. 3(*a*), a main device (e.g., a TV or a mobile phone) connects to its surrounding sub devices (e.g., a speaker, a keyboard, and a mouse) to provide various services.

In such an environment, as the main device provides diversified services, the kind and number of surrounding devices for such a purpose increase.

The main device may receive signals from the surrounding sub devices to discover and recognize the sub devices, and the main device may form a connection to a specific one of the discovered and recognized sub devices and provide services.

For example, in FIG. 3(*a*), the main device, e.g., a TV, may recognize portable speaker 1 via an advertisement packet transmitted from portable speaker 1 and form a connection with portable speaker 1 to provide an A2Dp service.

As such, where there are a plurality of main devices and a plurality of sub devices, different settings may be made to the parameters (e.g., volume, brightness, and equalizer (EQ)) related to the service depending on the use environment and users of the main devices and sub devices.

However, the settings are not separately stored nor are they applied when the service is reused, and this causes inconvenience in using services.

Further, although the main device is connected to a sub device to provide the same service as shown in FIG. 3(*b*), it is required to separately turn off or deactivate the main power of the main device and the sub device.

In other words, even when the main power of the main device turns off, the power of the sub devices does not.

This results in the problem that the main power of the main device and sub devices needs to be separately turned off.

Thus, according to the disclosure, to address such a problem, there is proposed a method of controlling sub devices without any separate control signal depending on the operation of a main device.

Figure 4:
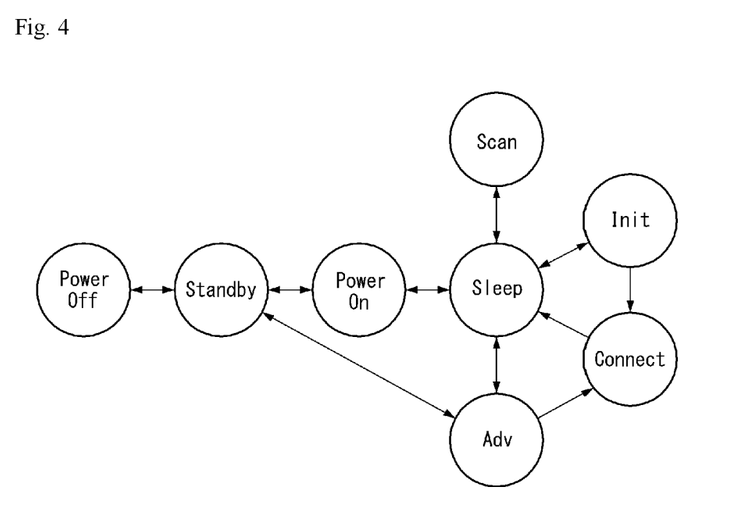
FIG. 4 is an example state diagram illustrating the state of devices proposed according to the disclosure.

FIG. 4 is an example state diagram illustrating the state of devices proposed according to the disclosure.

As shown in FIG. 4, a main device providing a specific service via BLE and a sub device may be present in various states on the application layer and perform operations for executing a specific procedure depending on each state as follows:

Power Off state: a state in which the main power of the device is off

Standby state: a standby mode state in which the main power is off and the power of the low power module is on Power On state: a state in which the main power of the device is on Sleep State: a state in which no single packet is transmitted/received Adv State: a state in which an advertisement packet is transmitted, a response to the transmitted advertisement packet is received, and a response to the received response is transmittable Scan State: a state in which packets transmitted on an advertisement channel are being scanned Init State: a state in which an advertisement packet for connection transmitted from an advertiser is received and a connection request message for requesting connection based thereupon may be sent Connect State: a state after a connection is formed A device may periodically transmit advertisement packets to its neighboring devices in the standby state and adv state.

In the adv state, the device transmits advertisement packets for connection and state reporting. However, in the standby state, the device transmits advertisement packets to its neighboring devices (in particular, the main device) simply for notifying them of its state.

In this case, the advertisement packets contain state information related to the state of the devices in the standby state.

Further, the devices in the standby state broadcast advertisement packets in a longer period than that in the adv state.

In other words, since the standby state is a state for reducing power consumption by leaving the device to wait without providing any service, a longer period of transmission of advertisement packets may be set for the standby state than for the adv state to thereby minimize power consumed for transmission of advertisement packets.

If having no connection with the main device and thus providing no service, the sub device may enter the standby state, minimizing power consumption.

In the standby state, the sub device periodically transmits advertisement packets in a longer period and, if recognizing that the main device powers on during the course, the sub device enters the adv state or scan state to form a connection with the main device to provide a specific service.

Use of such a way may minimize the power consumption of a device when the device is disconnected and thus provides no service.

Figure 5:
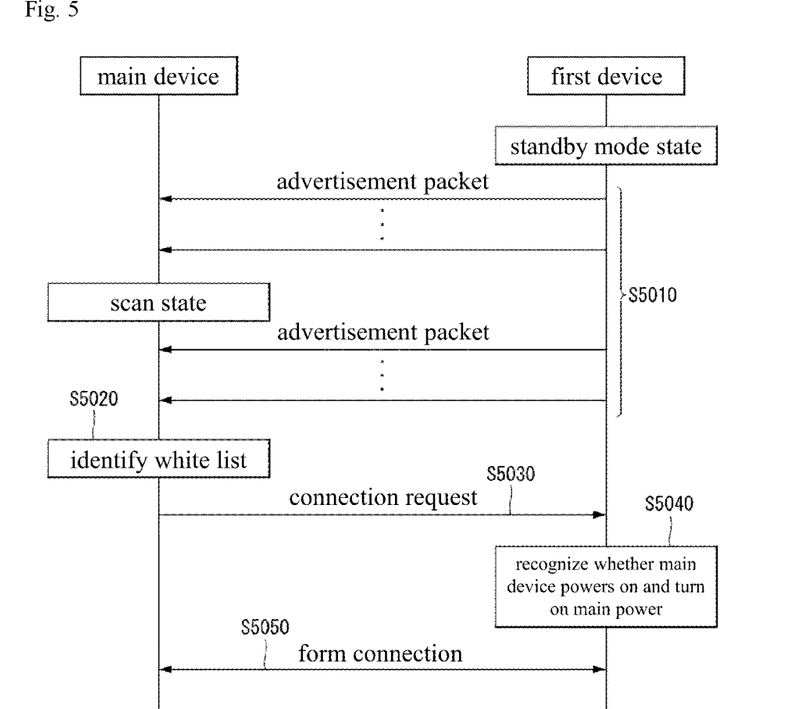
FIG. 5 is a flowchart illustrating an example method for powering on a device depending on the power of a main device as proposed according to the disclosure.

FIG. 5 is a flowchart illustrating an example method for powering on a device depending on the power of a main device as proposed according to the disclosure.

Referring to FIG. 5, a first device, which is a sub device, transmits advertisement packets in a standby mode state and, upon recognizing that the main power of a main device turns on, the first device may turn on its main power.

Specifically, the first device has formed a connection, or paired, with the main device before. The main device stores information (e.g., identification information, address, name, or parameter settings) related to the first device in a white list.

Thus, upon later receiving an advertisement packet from the first device, the main device may recognize that the first device is a device that has been connected or paired before via the first device identification information contained in the advertisement packet.

When disconnected from the main device, the first device enters the standby mode state described above in connection with FIG. 4.

In the standby mode state, the main power of the first device is off, and the first device periodically broadcasts advertisement packets to its neighboring devices in a preset time interval (S5010).

Thereafter, upon recognizing that the main power of the main device turns on, the first device may enter the scan state to scan packets transmitted from the neighboring devices.

After receiving the advertisement packet from the first device in the scan state, the main device identifies the white list to determine whether the first device is a device which has connected or paired with the main device before (S5020).

Where the first device is a device stored in the white list, the main device attempts to connect with the first device by transmitting a connection request message to the first device based on the received packet (S5030).

The first device may recognize whether the main device is powered on (or activated) to turn on the main power of the first device (S5040).

At this time, the first device may recognize whether the main power of the main device is turned on based on the connection request message from the main device.

Or, the first device may listen to a control signal, which is transmitted from a control device to the main device to turn on the main power of the main device, thereby recognizing whether the main power of the main device turns on.

In other words, the first device may listen to a control signal transmitted to the main device from the control device controlling the operation of the main device and, if the control signal indicates activation of the main power of the main device, the sub device may recognize whether the main power turns on.

Where the main power of the main device is activated, the first device may turn on the main power of the first device to form a connection with the main device to thereby provide a service.

Thereafter, the main device and the sub device may form a connection for wireless communication and provide a specific service via the formed connection (S5050).

For example, where the main power of the main device, e.g., a TV, turns on, the sub device, e.g., a speaker, may recognize the main power on of the TV, turn on its own main power, form a BLE connection with the TV, and provide a streaming service.

By this method, it may be possible to control the operation of the sub device by controlling the main device without the need for directly controlling the sub device.

According to another embodiment of the disclosure, when the main device powers on, the sub device may power off.

For example, where the main device is a gas oven, and the sub device is an air cleaner, if the main power of the gas oven turns on, then the air cleaner may recognize the turn-on of the gas oven, turning off its own main power.

Figure 6:
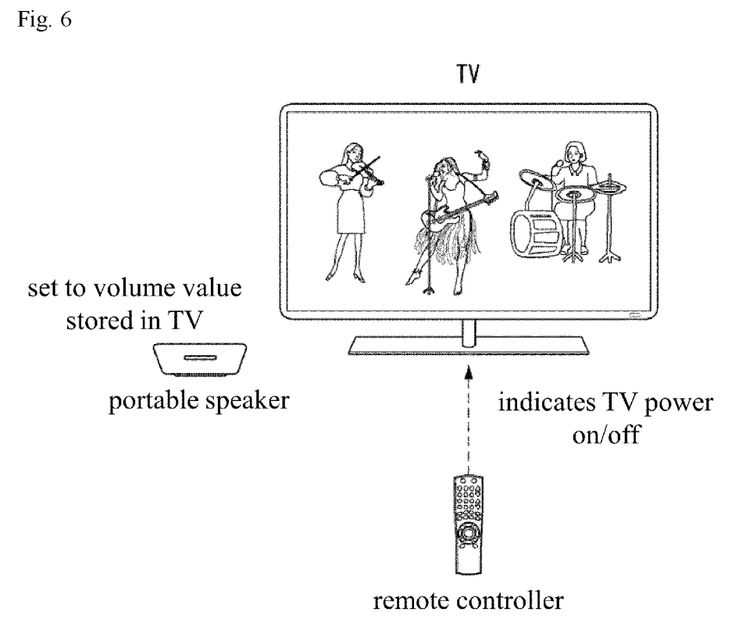
FIG. 6 is a view schematically illustrating an example method for setting parameters of a device depending on settings stored in a main device as proposed according to the disclosure.

FIG. 6 is a view schematically illustrating an example method for setting parameters of a device depending on settings stored in a main device as proposed according to the disclosure.

A main device forms a connection with a sub device via BLE and provides a service. If the service is stopped, the main device stores the last settings of the sub device.

Thereafter, if a connection with the sub device is formed again to provide the service, the main service transmits the stored settings to the sub device, setting parameters for providing the specific service of the sub device with the last settings stored.

Thereafter, the main device, along with the sub device, provides the specific service based on the set parameters.

For example, when the main device, e.g., a TV, receives a control signal, which indicates to provide a streaming service, from a control device, e.g., a remote controller, as shown in FIG. 6, the TV transmits the last settings stored to the sub device, e.g., a portable speaker, thereby setting parameters, e.g., volume, for providing a streaming service.

Thereafter, the main device may control the operation of the sub device based on control signals transmitted from the control device and vary the parameters.

Upon receiving a control signal indicating to terminate the streaming service from the control device, the main device stores the last sub device parameters varied (or set).

Or, where the parameters for providing the streaming service are varied, the sub device transmits the varied parameters to the main device before the streaming service terminates, and the main device stores the varied parameters.

This method enables setting the sub device parameters with the last settings stored even without the need for the user to separately set the parameters whenever receiving a service.

Figure 7:
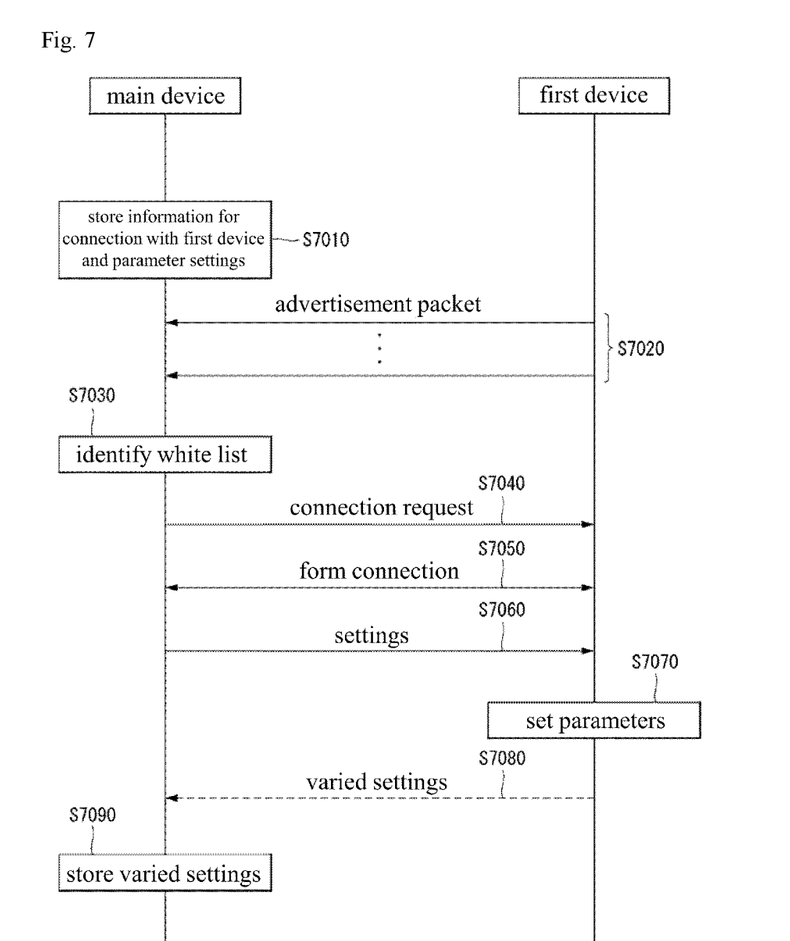
FIG. 7 is a flowchart illustrating an example method for setting parameters of a device depending on settings stored in a main device as proposed according to the disclosure.

FIG. 7 is a flowchart illustrating an example method for setting parameters of a device depending on settings stored in a main device as proposed according to the disclosure.

Referring to FIG. 7, a main device may set parameters for a first device, which is a sub device, based on the last settings stored, thereby providing a specific service.

Specifically, the main device has formed a BLE connection with the first device before to provide a specific service. Thereafter, if the service stops being provided and the connection with the sub device is thus released, the main device stores connection information for the first device, such settings as the last parameters (e.g., the last volume value or equalizer (EQ)) set to provide the specific service (S7010).

The connection information may include the address, and/or name of the first device.

The first device, upon disconnecting from the main device and hence entering the standby mode state, transmits, to its neighboring devices, advertisement packets in a longer time interval than in the adv state as described above in connection with step S5010 of FIG. 5 (S7020).

Thereafter, upon recognizing that the main power of the main device turns on, the first device may enter the scan state to scan packets transmitted from the neighboring devices.

After receiving the advertisement packet from the first device in the scan state, the main device identifies the white list, based on the connection information, to determine whether the first device is a device which has connected or paired with the main device before (S7030).

Where the connection information for the first device is stored in the white list, the main device attempts to connect with the first device by transmitting a connection request message to the first device based on the received packet (S7040).

The first device may recognize whether the main device is powered on (or activated) to turn on the main power of the first device.

At this time, the first device may recognize whether the main power of the main device is turned on based on the connection request message from the main device.

Or, the first device may listen to a control signal, which is transmitted from a control device to the main device to turn on the main power of the main device, thereby recognizing whether the main power of the main device turns on.

In other words, the first device may listen to a control signal transmitted to the main device from the control device controlling the operation of the main device and, if the control signal indicates activation of the main power of the main device, the sub device may recognize whether the main power turns on.

Where the main power of the main device is activated, the first device may turn on the main power of the first device to form a connection with the main device to thereby provide a service.

Thereafter, the main device and the sub device may form a connection for wireless communication (S7050).

To set parameters for providing a specific service, the main device may transmit the stored settings to the first device, and the first device may set parameters for providing the specific service based on the received settings (S707, S7080).

The main device may control the operation of the sub device based on control signals transmitted from the control device and vary the parameters.

Where the parameters for providing the streaming service are varied, the sub device transmits the varied parameters to the main device before the streaming service terminates, and the main device stores the varied parameters.

Thereafter, the main device may control the operation of the sub device based on control signals transmitted from the control device and vary the parameters.

Upon receiving a control signal indicating to terminate the streaming service from the control device, the main device stores the last sub device parameters varied (or set).

Or, where the parameters for providing the streaming service are varied, the sub device transmits the varied parameters to the main device before the streaming service terminates, and the main device stores the varied parameters (S7080, S7090).

Where none of the parameters are varied, steps S7080 and S7090 may not be performed.

Figure 8:
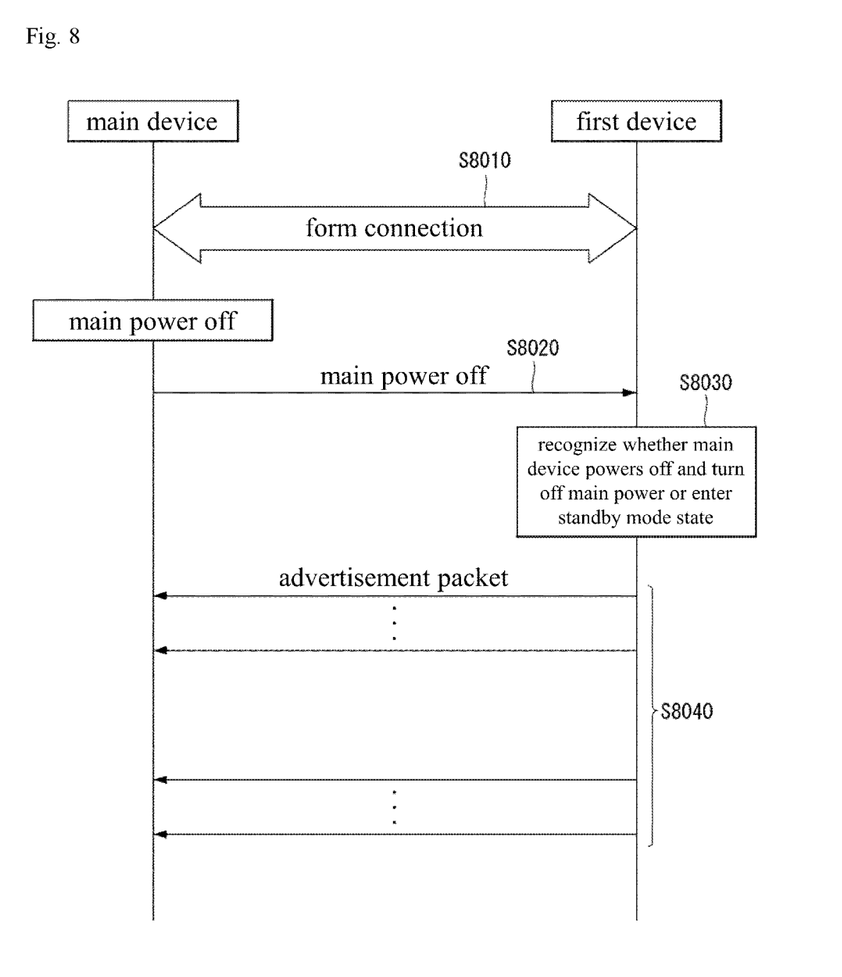
FIG. 8 is a flowchart illustrating an example method for powering off a device depending on the power of a main device as proposed according to the disclosure.

FIG. 8 is a flowchart illustrating an example method for powering off a device depending on the power of a main device as proposed according to the disclosure.

Referring to FIG. 8, a sub device may recognize that the main power of a main device turns off and turn off its own main power.

Specifically, the main device may form a connection with the first device to provide a specific service (S8010).

If the specific service is terminated later, the main device may turn off the main power, and the first device may recognize whether the main device is powered off (or deactivated) and turn off (or deactivate) the main power of the first device (S8030).

At this time, the first device may receive a message indicating that the main power of the main device turns off from the main device (S8020) and may recognize whether the main power of the main device has turned off based on the received message.

Or, the first device may listen to a control signal, which is transmitted from a control device to the main device to turn off the main power of the main device, thereby recognizing whether the main power of the main device turns off.

In other words, the first device may listen to a control signal transmitted to the main device from the control device controlling the operation of the main device and, if the control signal indicates deactivation of the main power of the main device, the sub device may recognize whether the main power turns off.

Thereafter, the first device may enter the standby mode state described above in connection with FIG. 4 and transmit advertisement packets to its neighboring devices in a predetermined time interval (S8040).

According to another embodiment of the disclosure, when the main device powers off, the sub device may power on.

For example, where the main device is a gas oven, and the sub device is an air cleaner, if the main power of the gas oven turns off, then the air cleaner may recognize the turn-on of the gas oven, turning on its own main power.

Figure 9:
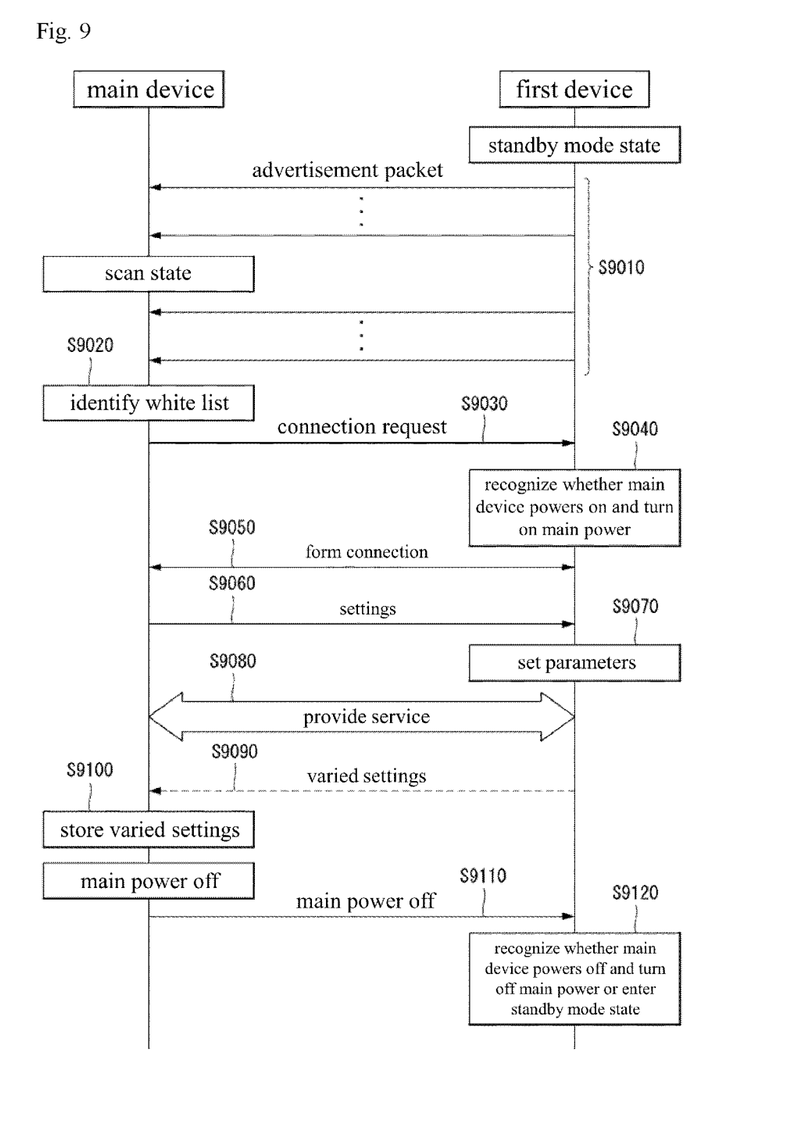
FIG. 9 is a flowchart illustrating an example method for providing a service as proposed according to the disclosure.

FIG. 9 is a flowchart illustrating an example method for providing a service as proposed according to the disclosure.

Referring to FIG. 9, a first device which is a sub device may turn on/off its own main power depending on the main power on/off of a main device, and the first device may receive settings stored in the main device to set parameters for providing a specific service.

Specifically, the first device has formed a connection, or paired, with the main device before. The main device stores information (e.g., identification information, address, name, or parameter settings) related to the first device in a white list.

Thus, upon later receiving an advertisement packet from the first device, the main device may recognize that the first device is a device that has been connected or paired before via the first device identification information contained in the advertisement packet.

Further, the main device stores such settings as the last parameters (e.g., the last volume value or equalizer (EQ)) set to, along with the first device, provide the specific service.

When disconnected from the main device, the first device enters the standby mode state described above in connection with FIG. 4.

In the standby mode state, the main power of the first device is off, and the first device periodically broadcasts advertisement packets to its neighboring devices in a preset time interval (S9010).

Thereafter, upon recognizing that the main power of the main device turns on, the first device may enter the scan state to scan packets transmitted from the neighboring devices.

After receiving the advertisement packet from the first device in the scan state, the main device identifies the white list to determine whether the first device is a device which has connected or paired with the main device before (S9020).

Where the first device is a device stored in the white list, the main device attempts to connect with the first device by transmitting a connection request message to the first device based on the received packet (S9030).

The first device may recognize whether the main device is powered on (or activated) to turn on the main power of the first device (S9040).

At this time, the first device may recognize whether the main power of the main device is turned on based on the connection request message from the main device.

Or, the first device may listen to a control signal, which is transmitted from a control device to the main device to turn on the main power of the main device, thereby recognizing whether the main power of the main device turns on.

In other words, the first device may listen to a control signal transmitted to the main device from the control device controlling the operation of the main device and, if the control signal indicates activation of the main power of the main device, the sub device may recognize whether the main power turns on.

Where the main power of the main device is activated, the first device may turn on the main power of the first device to form a connection with the main device to thereby provide a service.

Thereafter, the main device and the sub device may form a connection for wireless communication (S9050).

To set parameters for providing a specific service, the main device may transmit the stored settings to the first device, and the first device may set parameters for providing the specific service based on the received settings (S9060, S9070).

Thereafter, the main device, together with the first device, may provide the specific service based on the set parameters (S9080).

For example, where the main power of the main device, e.g., a TV, turns on, the sub device, e.g., a speaker, may recognize the main power on of the TV, turn on its own main power, and receive, from the TV, settings for providing a streaming service (e.g., an advanced audio distribution profile (A2DP)) to thereby set parameters.

Thereafter, the main device and the first device may provide a streaming service (e.g., an advanced audio distribution profile (A2DP)) based on the set parameters.

The main device may control the operation of the sub device based on control signals transmitted from the control device and vary the parameters.

Where the parameters for providing the streaming service are varied, the sub device transmits the varied parameters to the main device before the streaming service terminates (S9090), and the main device stores the varied parameters (S9100).

If the specific service is terminated later, the main device may turn off the main power, and the first device may recognize whether the main device is powered off (or deactivated) and turn off (or deactivate) the main power of the first device or enter the standby mode state (S9120).

At this time, the first device may receive a message indicating that the main power of the main device turns off from the main device (S9110) and may recognize whether the main power of the main device has turned off based on the received message.

Or, the first device may listen to a control signal, which is transmitted from a control device to the main device to turn off the main power of the main device, thereby recognizing whether the main power of the main device turns off.

In other words, the first device may listen to a control signal transmitted to the main device from the control device controlling the operation of the main device and, if the control signal indicates deactivation of the main power of the main device, the sub device may recognize whether the main power turns off.

At this time, where the battery power is at a predetermined level or less, the first device may turn off its main power and, if the battery power is at the predetermined level or more, the first device may enter the standby mode state.

Upon entry into the standby mode state, the first device may transmit advertisement packets to its neighboring devices in a predetermined time interval as described above in connection with FIG. 4.

All or some of the embodiments may be selectively combined so that various changes or modifications may be made thereto, but rather than being limited in configuration and method to those described above.

Various changes in form or detail may be made to the disclosure by one of ordinary skill in the art without departing from the scope of the disclosure, and the disclosure is not limited to the above-described embodiments and the accompanying drawings.

INDUSTRIAL AVAILABILITY

The disclosure relates to Bluetooth data transmission/reception, and particularly, to a method and apparatus for providing a service via a wireless communication means using Bluetooth low energy (BLE) technology.

The invention claimed is:

1. A method for providing a service by a first device in a wireless communication system, the method comprising:
    transmitting an advertisement packet representing a state of the first device to a main device in a standby state;
    receiving, from the main device which is powered on, a connection request message in response to the advertisement packet;
    activating main power to provide a specific service based on the connection request message and recognizing activation of main power by the main device;
    establishing a Bluetooth low energy (BLE) connection with the main device based on the connection request message; and
    receiving, from the main device, a setting message including setting parameters for providing the specific service,
    wherein the setting parameters included in the setting message are the same parameters used when the specific service was last provided, and
    wherein the setting parameters are updated each time the BLE connection with the main device is released.

2. The method of claim 1, further comprising, when the setting parameters are varied, transmitting the varied setting parameters to the main device.

3. The method of claim 1, further comprising deactivating the main power of the first device upon recognizing deactivation of the main power of the main device.

4. The method of claim 1, wherein the advertisement packet is transmitted to a neighboring device according to a predetermined time interval in the specific state, and wherein a first time interval in which the advertisement packet is periodically transmitted in the specific state is longer than a second time interval in which an advertisement packet transmitted for connection in an advertisement state is transmitted.

5. A first device for providing a service in a wireless communication system, the first device comprising:
    a transceiver for wireless or wired communication; and
    a processor functionally connected with the transceiver, wherein the processor:
    transmits an advertisement packet representing a state of the first device to a main device in a standby state;
    receives, from the main device which is powered on, a connection request message in response to the advertisement packet;
    activates main power to provide a specific service based on the connection request message and recognizing activation of main power by the main device;
    establishes a Bluetooth low energy (BLE) connection with the main device based on the connection request message; and
    receives, from the main device, a setting message including setting parameters for providing the specific service,
    wherein the setting parameters included in the setting message are the same parameters used when the specific service was last provided, and
    wherein the setting parameters are updated each time the BLE connection with the main device is released.

* * * * *